(12) United States Patent
Huang et al.

(10) Patent No.: US 11,485,820 B2
(45) Date of Patent: Nov. 1, 2022

(54) POLYCARBONATE POLYESTER

(71) Applicant: Chang Chun Plastics Co., Ltd., Taipei (TW)

(72) Inventors: Ching-Jui Huang, Taipei (TW); Ping-Chieh Wang, Taipei (TW)

(73) Assignee: Chang Chun Plastics Co., Ltd., Taipei (TW)

( * ) Notice: Subject to any disclaimer, the term of this patent is extended or adjusted under 35 U.S.C. 154(b) by 105 days.

(21) Appl. No.: 17/137,987

(22) Filed: Dec. 30, 2020

(65) Prior Publication Data

US 2022/0098365 A1  Mar. 31, 2022

(30) Foreign Application Priority Data

Sep. 29, 2020 (TW) ................... 109133778

(51) Int. Cl.
*C08G 64/02* (2006.01)
*C08G 64/16* (2006.01)
*C08G 63/672* (2006.01)

(52) U.S. Cl.
CPC ....... *C08G 64/1608* (2013.01); *C08G 63/672* (2013.01)

(58) Field of Classification Search
USPC ........................ 528/196, 198, 307
See application file for complete search history.

(56) References Cited

U.S. PATENT DOCUMENTS 6,667,381 B2  12/2003  Takakuwa et al.

FOREIGN PATENT DOCUMENTS

| CN | 1240751 A | 1/2000 |
|---|---|---|
| CN | 101679617 A | 3/2010 |
| CN | 102216368 A | 10/2011 |
| CN | 103619908 A | 3/2014 |
| JP | H01223119 A | 9/1989 |
| JP | 2004085644 A | 3/2004 |
| JP | 2013181092 A | * 9/2013 |
| JP | 2016533428 A | 10/2016 |
| KR | 20190062049 A | 6/2019 |
| KR | 20200005340 A | 1/2020 |
| TW | 201936704 A | 9/2019 |
| TW | 202104350 A | 2/2021 |

OTHER PUBLICATIONS

JP2013181092A Yasuhiko Tomonari; Copolymerized polyester whose molded article has low content of (Year: 2013).*

* cited by examiner

*Primary Examiner* — Terressa Boykin
(74) *Attorney, Agent, or Firm* — Joseph C. Zucchero; Carolyn S. Elmore; Elmore Patent Law Group, P.C.

(57) ABSTRACT

A polycarbonate polyester includes residues of following formula (1), formula (2) and formula (3):

$$*\!\!-\!\!\left[\!\!\begin{array}{c}O\!-\!R_1\!-\!O\end{array}\!\!\right]\!\!-\!\!*$$ formula (1)

$$*\!\!-\!\!\left[\!\!\begin{array}{c}O\\\|\\O\!-\!C\!-\!O\end{array}\!\!\right]\!\!-\!\!*$$ formula (2)

$$*\!\!-\!\!\left[\!\!\begin{array}{c}O\quad\quad O\\\|\quad\quad\|\\O\!-\!C\!-\!R_2\!-\!C\!-\!O\end{array}\!\!\right]\!\!-\!\!*$$ formula (3)

in which $R_1$ is $C_2$-$C_{15}$ hydrocarbon group; $R_2$ is $C_4$-$C_{16}$ hydrocarbon group; a molar ratio of the residue of the formula (2) to the residue of the formula (1) is in a range of greater than 0.05 to less than 0.8; * represents a linking bond.

14 Claims, No Drawings

POLYCARBONATE POLYESTER

CROSS-REFERENCE TO RELATED APPLICATION

This application claims priority to Taiwan Application Serial Number 109133778, filed Sep. 29, 2020, which is herein incorporated by reference.

BACKGROUND

Field of Invention

The present disclosure relates to a polycarbonate polyester, and particularly relates to a polycarbonate polyester including specific residues (i.e., following formulas (1), (2) and (3)).

Description of Related Art

In general, polycarbonate has poor heat resistance, chemical resistance, and impact resistance. If polycarbonate is used in combination with polyester, chemical resistance of the composition can be improved, but heat resistance and impact resistance of the composition will be significantly reduced. Therefore, how to make polycarbonate polyester possess both good heat resistance and good mechanical properties has become an urgent issue in this field.

SUMMARY

One aspect of the present disclosure provides a polycarbonate polyester, including residues represented by following formula (1), formula (2) and formula (3):

formula (1)

formula (2)

formula (3)

in which $R_1$ is $C_2$-$C_{15}$ hydrocarbon group; $R_2$ is $C_4$-$C_{16}$ hydrocarbon group; a molar ratio of the residue of the formula (2) to the residue of the formula (1) is in a range of greater than 0.05 to less than 0.8; * represents a linking bond.

In some embodiments of the present disclosure, the molar ratio of the residue of the formula (2) to the residue of the formula (1) is in a range of 0.1 to 0.6.

In some embodiments of the present disclosure, the residue of the formula (1) includes:

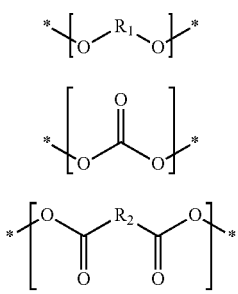

In some embodiments of the present disclosure, the residue of the formula (1) further includes a $C_2$-$C_{15}$ aliphatic linear or branched diol residue.

In some embodiments of the present disclosure, the $C_2$-$C_{15}$ aliphatic linear or branched diol residue is selected from the group consisting of:

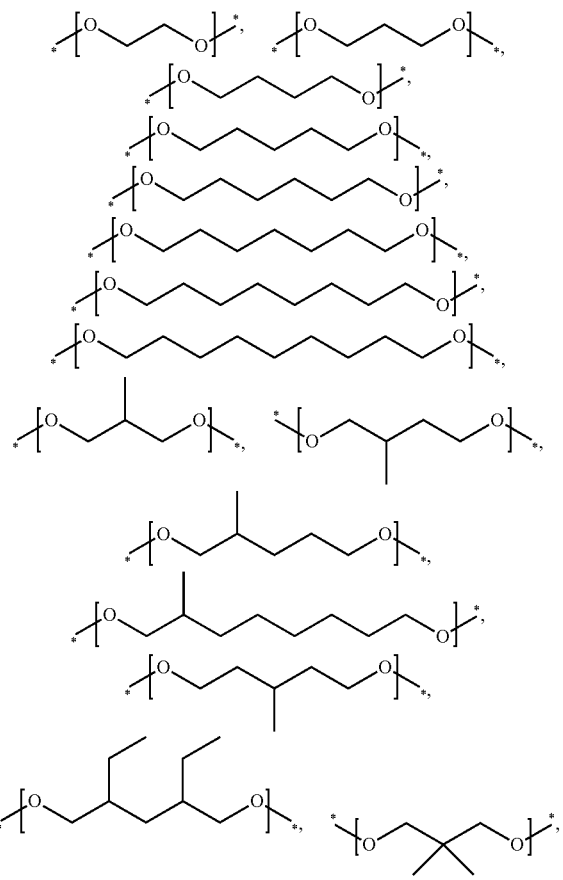

and a combination thereof, in which * represents the linking bond.

In some embodiments of the present disclosure, the $C_2$-$C_{15}$ aliphatic linear or branched diol residue is selected from the group consisting of:

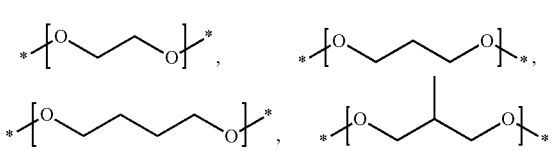

and a combination thereof, in which * represents the linking bond.

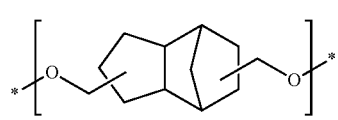

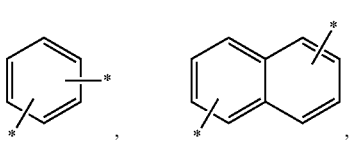

In some embodiments of the present disclosure, $R_2$ is or a combination thereof, in which * represents the linking bond.

In some embodiments of the present disclosure, the residue of the formula (3) is present in an amount of no more than 50 mol % of the polycarbonate polyester.

In some embodiments of the present disclosure, $R_1$ of the formula (1) is a polycycloalkyl group.

In some embodiments of the present disclosure, $R_1$ of the formula (1) is a bicycloalkyl group or a tricycloalkyl group.

In some embodiments of the present disclosure, the polycarbonate polyester further includes a residue represented by following formula (4):

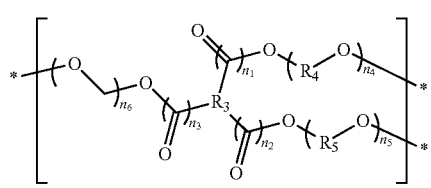

formula (4)

in which $R_3$ is a $C_3$-$C_{20}$ hydrocarbon group; $R_4$, $R_5$ and $R_6$ are $C_1$-$C_6$ hydrocarbon groups; and $n_1$, $n_2$, $n_3$, $n_4$, $n_5$ and $n_6$ are 0 or 1.

In some embodiments of the present disclosure, $R_3$ is a $C_3$-$C_{20}$ aliphatic hydrocarbon group or a $C_4$-$C_{20}$ aromatic hydrocarbon group.

In some embodiments of the present disclosure, the residue represented by the formula (4) is selected from the group consisting of:

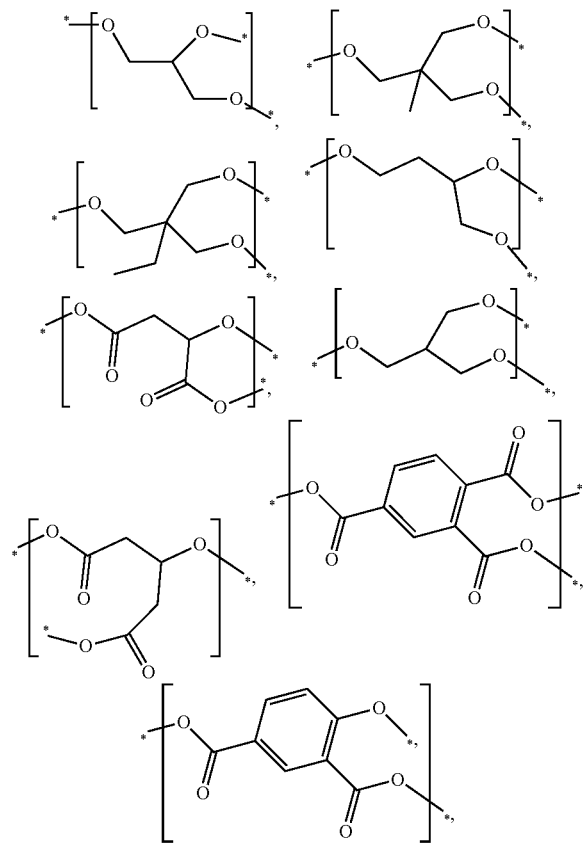

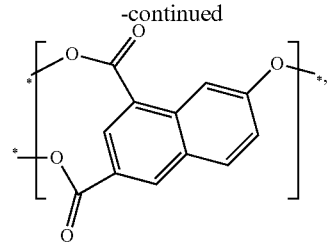

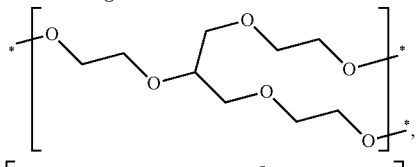

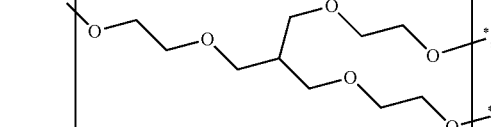

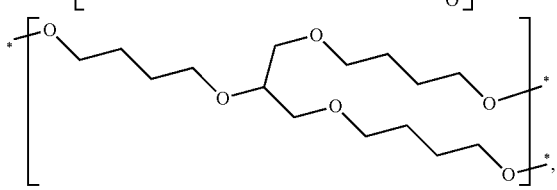

and a combination thereof, wherein * indicates a linking bond.

In some embodiments of the present disclosure, the residue of the formula (2) is derived from a dialkyl carbonate monomer.

In some embodiments of the present disclosure, the residue of the formula (4) is present in an amount of less than or equal to 0.4 mol % of the polycarbonate polyester.

In some embodiments of the present disclosure, the residue of the formula (4) is present in an amount of 0.05 mol % to 0.2 mol % of the polycarbonate polyester.

DETAILED DESCRIPTION

In order to make the description of the present disclosure more detailed and complete, the following provides an illustrative description for the implementation of the present disclosure and specific embodiments; but this is not the only way to implement or use the specific embodiments of the present disclosure. The embodiments disclosed below can be combined or substituted with each other under beneficial circumstances, and other embodiments can also be added to an embodiment without further description. In the following description, many specific details will be described in detail to enable the reader to fully understand the following embodiments. However, the embodiments of the present disclosure can be practiced without such specific details.

One aspect of the present disclosure provides a polycarbonate polyester, which includes residues represented by following formula (1), formula (2) and formula (3):

formula 1)

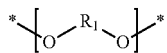

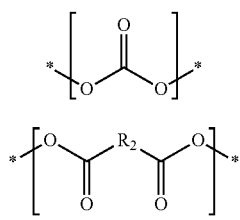

in which $R_1$ is a $C_2$-$C_{15}$ hydrocarbon group, and $R_2$ is a $C_4$-$C_{16}$ hydrocarbon group. * represents a linking bond.

A molar number of the residue of the formula (2) is smaller than that of the formula (1), that is, the molar number of a dialkyl carbonate monomer is smaller than that of a diol monomer. It is worth noting that a molar ratio of the residue of the formula (2) to the residue of the formula (1) is in a range of greater than 0.05 to less than 0.8, which can make the polycarbonate polyester possess good heat resistance and mechanical properties. In some embodiments, the molar ratio of the residue of the formula (2) to the residue of the formula (1) is in a range of 0.1 to 0.6, and the molar ratio may be, for example, 0.15, 0.2, 0.25, 0.3, 0.35, 0.4, 0.45, 0.5 or 0.55.

In some embodiments, the residue of the formula (1) is derived from the diol monomer. In some embodiments, the diol monomer includes a polycycloalkane dialkyl alcohol, for example, a dicycloalkane dialkyl alcohol or a tricycloalkane dialkyl alcohol. In some embodiments, $R_1$ of the formula (1) is a $C_7$-$C_{17}$ polycycloalkyl group, such as a bicycloalkyl group or a tricycloalkyl group. In some embodiments, the residue of the formula (1) includes:

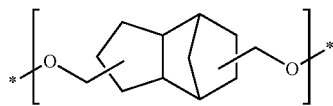

and $R_1$ is

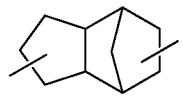

In some embodiments, this residue is derived from tricyclodecane dimethanol (TCDDM).

In some embodiments, the diol monomer further includes aliphatic linear diol or aliphatic branched dial. In some embodiments, the residue of the formula (1) further includes a $C_2$-$C_{15}$ aliphatic linear or branched diol residue.

In some embodiments, the aliphatic linear diol may be, for example, ethylene glycol (EG), propylene glycol (PG), butanediol (BDO), pentanediol, hexanediol, heptanediol, octanediol, nonanediol or decanediol. In some embodiments, the residue of the formula (1) further includes a $C_2$-$C_9$ aliphatic linear diol residue, and $R_1$ is a $C_2$-$C_9$ linear alkyl group. In some embodiments, the residue of the formula (1) further includes a $C_2$-$C_6$ aliphatic linear diol residue, and $R_1$ is a $C_2$-$C_6$ linear alkyl group. In some embodiments, the residue of the formula (1) further includes a $C_2$-$C_4$ aliphatic linear diol residue, and $R_1$ is a $C_2$-$C_4$ linear alkyl group.

In some embodiments, the aliphatic branched diol may be, for example, 2-methyl-1,3-propanediol (MPO), 2-methyl-1,3-pentanediol, 2-ethyl-1,3-propanediol, 2-ethyl-1,6-hexanediol, 2-butyl-1,3-propanediol, 2-methyl-1,4-butanediol, 2-methyl-1,5-pentanediol, 2-methyl-1,8-octanediol, 2-ethyl-1,5-pentanediol, 3-methyl-1,5-pentanediol, 2,4-dimethyl-1,5-pentanediol, 2,4-diethyl-1,5-pentanediol, 2-butyl-2-ethyl-1,3-propanediol or 2,2-dimethyl-1,3-propanediol. In some embodiments, the residue of the formula (1) further includes a $C_4$-$C_9$ aliphatic branched diol residue, and $R_1$ is a $C_4$-$C_9$ branched alkyl group.

In some embodiments, the $C_2$-$C_{15}$ aliphatic linear or branched diol residue is selected from the group consisting of:

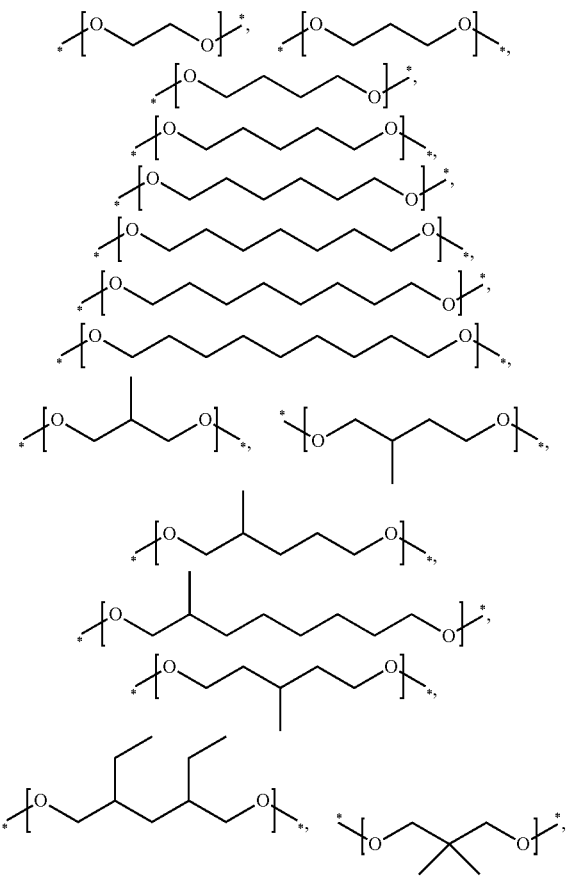

and a combination thereof, in which * represents the linking bond.

In some embodiments, the $C_2$-$C_{15}$ aliphatic linear or branched diol residue is selected from the group consisting of:

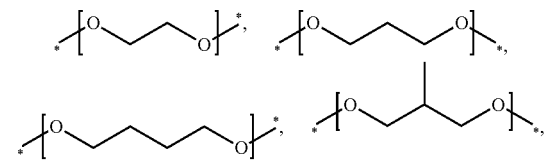

and a combination thereof, in which * represents the linking bond.

In some embodiments, the residue of the formula (2) is derived from the dialkyl carbonate monomer. In some embodiments, the dialkyl carbonate monomer is dimethyl carbonate (DMC), diethyl carbonate (DEC), dipropyl carbonate, dibutyl carbonate (DBC), dipentyl carbonate, diphenyl carbonate, or a combination thereof. In some embodiments, the residue of the formula (2) is derived from dibutyl carbonate.

The residue of the formula (3) is derived from a diacid monomer. In some embodiments, the diacid monomer includes an aromatic dicarboxylic acid, such as terephthalic acid (PTA) or 2,6-naphthalenedicarboxylic acid (NDA). In some embodiments, $R_2$ of the formula (3) is a $C_6$-$C_{16}$ aromatic group. In some embodiments, $R_2$ of the formula (3) is

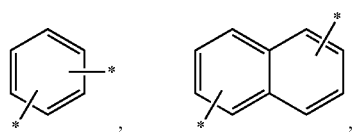

or a combination thereof, in which * represents the linking bond.

In some embodiments, the residue of the formula (3) is present in an amount of no more than (i.e., less than or equal to) 50 mol % of the polycarbonate polyester. In some embodiments, a molar number of the diacid monomer is less than or equal to 50 mol % of the sum of the molar numbers of the diol monomer, the dialkyl carbonate monomer, and the diacid monomer.

In some embodiments, the polycarbonate polyester further includes a residue represented by following formula (4):

formula (4)

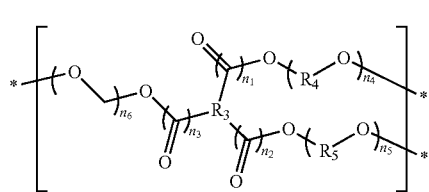

in which $R_3$ is a $C_3$-$C_{20}$ hydrocarbon group, and $R_4$, $R_5$ and $R_6$ are $C_1$-$C_6$ hydrocarbon groups, and $n_1$, $n_2$, $n_3$, $n_4$, $n_5$ and $n_6$ are 0 or 1. In some embodiments, $R_3$ is a $C_3$-$C_{20}$ aliphatic hydrocarbon group or a $C_4$-$C_{20}$ aromatic hydrocarbon group.

In some embodiments, the residue of the formula (4) is selected from the group consisting of:

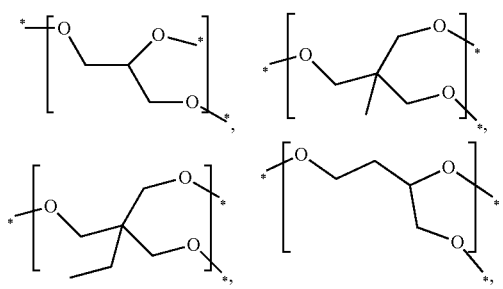

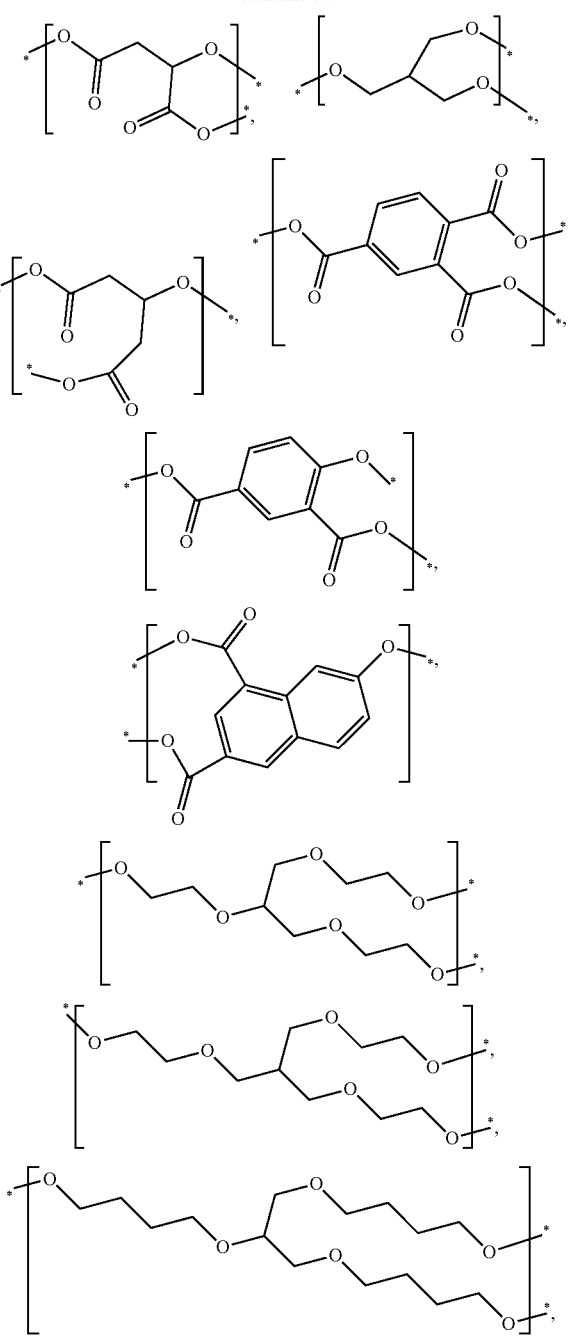

and a combination thereof, in which * represents a linking bond.

In some embodiments, the residue of the formula (4) is derived from a monomer having a group of the formula (4), and the monomer having the group of the formula (4) is selected from the group consisting of:

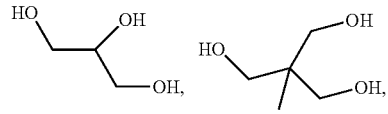

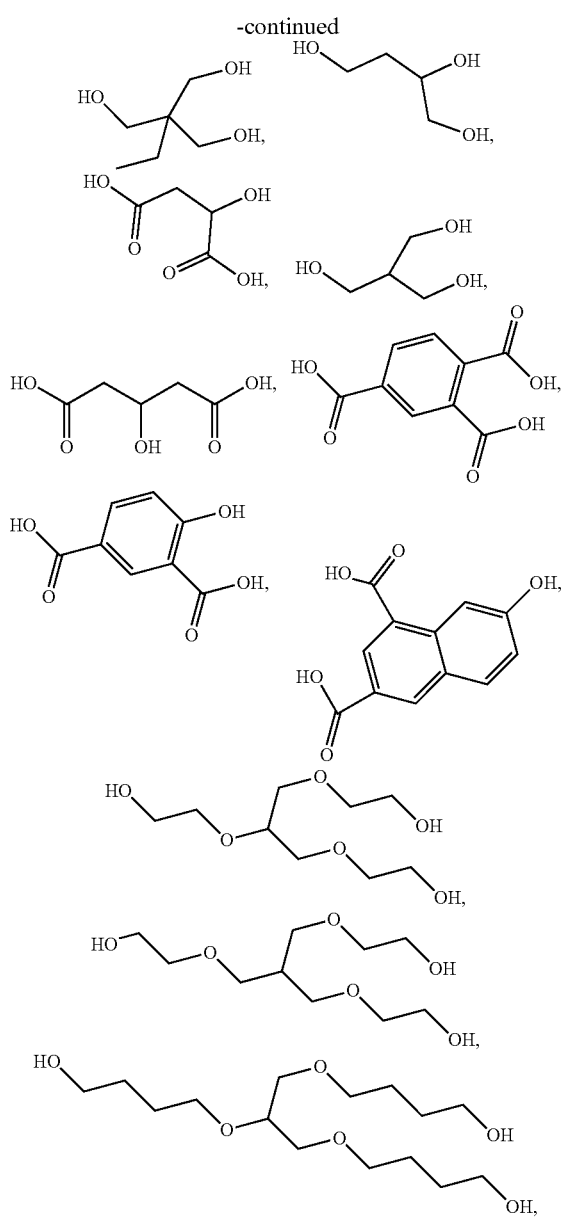

and a combination thereof, in which * represents the linking bond.

In some embodiments, the residue of the formula (4) is present in an amount of less than or equal to 0.4 mol % of the polycarbonate polyester. In some embodiments, the residue of the formula (4) is present in an amount of 0.05 mol % to 0.2 mol % of the polycarbonate polyester.

The polycarbonate polyester of the present disclosure may be used for shaped products. The shaped products may be, for example, food contacts, automotive molds, commercial housewares, composite consumables, electronic products, consumer housewares, device housings, displays, in-store fixtures, electronic packaging, outdoor signs, personal care, cosmetics packaging, sporting equipment tools, toys, and water/sport bottles, etc., but not limited thereto.

As described above, the polycarbonate polyester of the present disclosure is formed by reactions of the above-mentioned monomers. In some embodiments, preparing the polycarbonate polyester of the present disclosure includes the following operations: (a) uniformly mixing various monomers and catalysts to form a mixture; (b) placing the mixture in an appropriate pressure environment and heating the mixture to allow the monomers to react to form oligomers; and (c) heating the mixture containing the oligomers, and performing vacuum pumping to remove unreacted monomers, and then continuously placing the mixture at the heating temperature to allow the oligomers in the mixture to polymerize to form the polycarbonate polyester.

In some embodiments, the operation (a) is performed in an autoclave. In some embodiments, the operation (a) uniformly mixing the various monomers and catalysts is conducted by stirring, and a stirring rate may be in a range of 100 rpm to 500 rpm.

In some embodiments, the catalyst for the operation (a) is, for example, titanium (IV) butoxide (TBT), antimony trioxide ($Sb_2O_3$), antimony triacetate ($Sb(OAc)_3$), germanium dioxide ($GeO_2$) or titanium (IV) isopropoxide, but not limited thereto.

In some embodiments, in the operation (a), a co-catalyst can be optionally added. The co-catalyst is, for example, magnesium acetate ($Mg(OAc)_2$) or zinc acetate ($Zn(OAc)_2$), but not limited thereto. In some embodiments, in the operation (a), a triol, a crosslinking agent, a heat stabilizer, or a combination thereof can be optionally added. The triol is, for example, the above-mentioned monomer having the group of the formula (4). The crosslinking agent is, for example, trimellitic acid (TMA) or trimethylolpropane (TMP). The heat stabilizer is, for example, triphenyl phosphite, phosphoric acid, phosphorous acid, hypophosphorous acid and its salts, trimethyl phosphate (TMP), triethyl phosphate (TEP), tripropyl phosphate (TPP), 3,9-bis(octadecyloxy)-2,4,8,10-tetraoxa-3,9-diphosphospiro[5.5]undecane, bis(2,6-di-tert-butyl-4-methylphenyl)pentaerythritol-diphosphite, tris(2,4-di-tert-butylphenyl)phosphite, tetrakis(2,4-di-tert-butylphenyl)4,4'-biphenyldi.

In some embodiments, the heating in the operation (b) refers to heating from room temperature to 220° C. or from room temperature to 260° C. In some embodiments, the appropriate pressure for the operation (b) is in a range of 1 atm to 6 atm. In some embodiments, the appropriate pressure for operation (b) is in a range of 1.5 atm to 4 atm.

In some embodiments, the reaction situation is judged by observing an amount of water (or alcohol, phenol or hydrochloric acid gas) generated in the operation (b). Specifically, through theoretical calculations, a theoretical amount of water (or alcohol, phenol or hydrochloric acid gas) produced after all monomers in the mixture are reacted can be obtained. When the amount of water (or alcohol, phenol or hydrochloric acid gas) produced reaches more than or equal to 80% (e.g., 85%, 90%, or 95%) of the theoretical amount of water (or alcohol, phenol or hydrochloric acid gas), the reaction is almost complete, and the operation (c) can be performed.

In some embodiments, the heating in the operation (c) refers to heating from 250° C. to 300° C. In some embodiments, the vacuum pumping in the operation (c) brings the ambient pressure to less than or equal to 3 torr. In some embodiments, the vacuum pumping in the operation (c) brings the ambient pressure to less than 1 torr. In some embodiments, the vacuum pumping in the operation (c) is performed for 30-60 minutes, for example, 40 minutes or 50 minutes.

In some embodiments, the oligomers will release diol during the polymerization reaction, and viscosity of the mixture will gradually increase. The product can be collected when the viscosity of the mixture reaches a certain value. In some embodiments, the time of the operation (c) is in a range of 1.5 hours to 8 hours.

Following experimental examples are used to describe specific aspects of the present invention, and enable the person having ordinary skill in the art of the present invention to implement the present invention. However, the following experimental examples are not intended to limit the present invention.

Comparative Examples 1 to 4 and Experimental Examples 1 to 4

Tricyclodecane dimethanol (TCDDM), 1,4-cyclohexanedimethanol (CHDM), dibutyl carbonate (DBC), ethylene glycol (EG), terephthalic acid (PTA), trimellitic acid (TMA), trimethylolpropane (TMP), titanium (IV) butoxide (TBT) and $Mg(OAc)_2$ were added to an autoclave with different weight ratios and stirred uniformly to form mixtures of Comparative Examples 1 to 4 and Experimental Examples 1 to 4. Compositions of the mixtures of Comparative Examples 1 to 4 and Experimental Examples 1 to 4 will be described in detail below.

Comparative Example 1 included 662.5 grams of TCDDM, 153.6 grams of EG, 747.6 grams of PTA, and 0.619 grams of TBT.

Comparative Example 2 included 706.6 grams of TCDDM, 39.2 grams of DBC, 153.6 grams of EG, 747.6 grams of PTA, and 0.619 grams of TBT.

Comparative Example 3 included 1369.1 grams of TCDDM, 627.3 grams of DBC, 153.6 grams of EG, 747.6 grams of PTA, 2.4 grams of TMP and 0.619 grams of TBT.

Comparative Example 4 included 746.3 grams of CHDM, 313.6 grams of DBC, 153.6 grams of EG, 747.6 grams of PTA, and 0.619 grams of TBT.

Experimental Example 1 included 750.8 grams of TCDDM, 78.4 grams of DBC, 153.6 grams of EG, 747.6 grams of PTA, and 0.619 grams of TBT.

Experimental Example 2 included 927.5 grams of TCDDM, 235.2 grams of DBC, 153.6 grams of EG, 747.6 grams of PTA, 0.619 grams of TBT, and 0.21 grams of $Mg(OAc)_2$.

Experimental Example 3 included 1015.8 grams of TCDDM, 313.6 grams of DBC, 153.6 grams of EG, 747.6 grams of PTA, and 0.619 grams of TBT.

Experimental Example 4 included 1192.5 grams of TCDDM, 470.4 grams of DBC, 153.6 grams of EG, 747.6 grams of PTA, 3.5 grams of TMA, and 0.619 grams of TBT.

The above operation (b) placing the mixture in the appropriate pressure environment and heating the mixture to allow the monomers to react to form the oligomers; and operation (c) heating the mixture containing the oligomers, and performing vacuum pumping to remove the unreacted monomers, and then continuously placing the mixture at the heating temperature to allow the oligomers in the mixture to polymerize were then performed to form polyester of Comparative Example 1 and polycarbonate polyester of Comparative Examples 2 to 4 and Experimental Examples 1 to 4.

The products of Comparative Examples 1 to 4 and Experimental Examples 1 to 4 were tested for tensile strength, flexural strength, impact resistance, glass transition temperature (Tg), melting temperature (Tm), intrinsic viscosity (IV) and transmittance. Test results are listed in Table 1 and Table 2.

The tensile strength was tested using a universal material testing machine (manufactured by Instron) and in accordance with ISO 527.

The flexural strength was tested using the universal material testing machine and in accordance with ISO 178.

The impact resistance was tested using a testing machine manufactured by Intertek and in accordance with ISO 180.

The glass transition temperature and melting temperature were tested using a differential scanning calorimetry (DSC, sold by TA instruments) and in accordance with ISO 3146.

The intrinsic viscosity was tested in accordance with ASTM D4603.

The transmittance was tested using a haze meter (NIPPON DENSHOKU NDH-2000) and in accordance with ASTM D1003.

TABLE 1

|  | Comparative Example 1 | Comparative Example 2 | Experimental Example 1 | Experimental Example 2 |
|---|---|---|---|---|
| Tensile strength (MPa) | 49 | 49 | 52 | 52 |
| Flexural strength (MPa) | 71 | 74 | 77 | 77 |
| Impact resistance ($KJ/m^2$) | 2.4 | 2.6 | 2.4 | 2.6 |
| Tg (° C.) | 109 | 110 | 112 | 115 |
| Tm (° C.) | N/A | N/A | N/A | N/A |
| IV (dl/g) | 0.65 | 0.65 | 0.65 | 0.65 |
| Transmittance (%) | 88 | 89 | 89 | 90 |

TABLE 2

|  | Experimental Example 3 | Experimental Example 4 | Comparative Example 3 | Comparative Example 4 |
|---|---|---|---|---|
| Tensile strength (MPa) | 53 | 51 | N/A | 45 |
| Flexural strength (MPa) | 77 | 72 | N/A | 65 |
| Impact resistance ($KJ/m^2$) | 2.6 | 1.6 | N/A | 2.4 |
| Tg (° C.) | 117 | 119 | 108 | 90 |
| Tm (° C.) | N/A | N/A | N/A | 274 |
| IV (dl/g) | 0.63 | 0.40 | <0.3 | 0.64 |
| Transmittance (%) | 90 | 90 | N/A | N/A |

The molar ratios of formula (2)/formula (1) of Comparative Example 1, Comparative Example 2, and Comparative Example 3 were 0, 0.05, and 0.8, respectively. As listed in Table 1 and Table 2, the glass transition temperature thereof was less than or equal to 110° C. The molar ratios of formula (2)/formula (1) of Experimental Examples 1 to 4 were 0.1, 0.3, 0.4, and 0.6, respectively. As listed in Tables 1 and 2, the glass transition temperature was between 112° C. and 119° C. It can be seen that the molar ratio of formula (2)/formula (1) in the range of greater than 0.05 to less than 0.8 can provide the polycarbonate polyester with higher glass transition temperature and thus to exhibit better heat resistance. In addition, it can provide better tensile strength and flexural strength, and the polycarbonate polyester has better mechanical properties.

The molar ratios of formula (2)/formula (1) of Experimental Example 3 and Comparative Example 4 were both 0.4, and the difference is that TCDDM and CHDM were respectively used in Experimental Example 3 and Comparative Example 4. As listed in Table 2, the glass transition temperatures of them were 117° C. and 90° C., respectively. It can be seen that the use of TCDDM can make the polycarbonate polyester have better heat resistance. In addition, it can also provide better tensile strength and flexural strength, and the polycarbonate polyester has better mechanical properties.

Comparative Example 5 and Experimental Example 5

Tricyclodecane dimethanol (TCDDM), dibutyl carbonate (DBC), butanediol (BDO), terephthalic acid (PTA) and titanium(IV) butoxide (TBT) were added to an autoclave with different weight ratios and stirred uniformly to form mixtures of Comparative Example 5 and Experimental Example 5. Compositions of the mixtures of Comparative Example 5 and Experimental Example 5 will be described in detail below.

Comparative Example 5 included 662.5 grams of TCDDM, 223.0 grams of BDO, 747.6 grams of PTA, and 0.619 grams of TBT.

Experimental Example 5 included 750.8 grams of TCDDM, 78.4 grams of DBC, 223.0 grams of BDO, 747.6 grams of PTA, and 0.619 grams of TBT.

The above operation (b) and operation (c) were then performed to form polyester of Comparative Example 5 and polycarbonate polyester of Experimental Example 5.

The products of Comparative Example 5 and Experimental Example 5 were tested for tensile strength, flexural strength, impact resistance, glass transition temperature, melting temperature, intrinsic viscosity, and transmittance. Test results are listed in Table 3.

TABLE 3

|  | Comparative Example 5 | Experimental Example 5 |
|---|---|---|
| Tensile strength (MPa) | 32 | 36 |
| Flexural strength (MPa) | 61 | 65 |
| Impact resistance (KJ/m$^2$) | 2.3 | 2.4 |
| Tg (° C.) | 103 | 106 |
| Tm (° C.) | N/A | N/A |
| IV (dl/g) | 0.63 | 0.68 |
| Transmittance (%) | 89 | 89 |

The molar ratios of formula (2)/formula (1) of Comparative Example 5 and Experimental Example 5 were 0 and 0.1, respectively. As listed in Table 3, compared with Comparative Example 5, Experimental Example 5 had higher tensile strength, flexural strength, impact resistance and glass transition temperature, and had better mechanical properties and heat resistance.

Comparative Example 6 and Experimental Example 6

Tricyclodecane dimethanol (TCDDM), dibutyl carbonate (DBC), 2-methyl-1,3-propanediol (MPO), terephthalic acid (PTA) and titanium (IV) butoxide (IV) (TBT) were added to an autoclave with different weight ratios and stirred uniformly to form mixtures of Comparative Example 6 and Experimental Example 6. Compositions of the mixtures of Comparative Example 6 and Experimental Example 6 will be described in detail below.

Comparative Example 6 included 662.5 grams of TCDDM, 39.2 grams of DBC, 223.0 grams of MPO, 747.6 grams of PTA, and 0.619 grams of TBT.

Experimental Example 6 included 1015.8 grams of TCDDM, 313.6 grams of DBC, 223.0 grams of MPO, 747.6 grams of PTA, and 0.619 grams of TBT.

The above operation (b) and operation (c) were then performed to form polycarbonate polyester of Comparative Example 6 and Experimental Example 6.

The products of Comparative Example 6 and Experimental Example 6 were tested for tensile strength, flexural strength, impact resistance, glass transition temperature, melting temperature, intrinsic viscosity, and transmittance. Test results are listed in Table 4.

TABLE 4

|  | Comparative Example 6 | Experimental Example 6 |
|---|---|---|
| Tensile strength (MPa) | 47 | 50 |
| Flexural strength (MPa) | 73 | 73 |
| Impact resistance (KJ/m$^2$) | 2.5 | 2.8 |
| Tg (° C.) | 104 | 107 |
| Tm (° C.) | N/A | N/A |
| IV (dl/g) | 0.60 | 0.55 |
| Transmittance (%) | 88 | 89 |

The molar ratios of formula (2)/formula (1) of Comparative Example 6 and Experimental Example 6 were 0.05 and 0.4, respectively. As listed in Table 4, compared with Comparative Example 6, Experimental Example 6 had higher tensile strength, impact resistance and glass transition temperature, and had better mechanical properties and heat resistance.

Comparative Example 7 and Experimental Example 7

Tricyclodecane dimethanol (TCDDM), dibutyl carbonate (DBC), ethylene glycol (EG), terephthalic acid (PTA), 1,4-naphthalenedicarboxylic acid (NDA) and titanium (IV) butoxide (TBT) were added to an autoclave with different weight ratios and stirred uniformly to form mixtures of Comparative Example 7 and Experimental Example 7. Compositions of the mixtures of Comparative Example 7 and Experimental Example 7 will be described in detail below.

Comparative Example 7 included 662.5 grams of TCDDM, 153.6 grams of EG, 448.6 grams of PTA, 389.1 grams of NDA, and 0.619 grams of TBT.

Experimental Example 7 included 750.8 grams of TCDDM, 78.4 grams of DBC, 153.6 grams of EG, 448.6 grams of PTA, 389.1 grams of NDA, and 0.619 grams of TBT.

The above operation (b) and operation (c) were then performed to form polyester of Comparative Example 7 and polycarbonate polyester of Experimental Example 7.

The products of Comparative Example 7 and Experimental Example 7 were tested for tensile strength, flexural strength, impact resistance, glass transition temperature, melting temperature, intrinsic viscosity, and transmittance. Test results are listed in Table 5.

TABLE 5

|  | Comparative Example 7 | Experimental Example 7 |
|---|---|---|
| Tensile strength (MPa) | 26 | 27 |
| Flexural strength (MPa) | 56 | 58 |
| Impact resistance (KJ/m$^2$) | 2.6 | 2.7 |

TABLE 5-continued

|  | Comparative Example 7 | Experimental Example 7 |
| --- | --- | --- |
| Tg (° C.) | 124 | 130 |
| Tm (° C.) | N/A | N/A |
| IV (dl/g) | 0.63 | 0.61 |
| Transmittance (%) | 89 | 90 |

The molar ratios of formula (2)/formula (1) of Comparative Example 7 and Experimental Example 7 were 0 and 0.1, respectively. As listed in Table 5, compared with Comparative Example 7, Experimental Example 7 had higher tensile strength, flexural strength, impact resistance and glass transition temperature, and had better mechanical properties and heat resistance.

Comparative Example 8 and Experimental Example 8

Tricyclodecane dimethanol (TCDDM), dibutyl carbonate (DBC), terephthalyl alcohol (PXG), ethylene glycol (EG), and terephthalic acid (PTA) was added to an autoclave with different molar ratios and stirred uniformly to form mixtures of Comparative Example 8 and Experimental Example 8. Compositions of the mixtures of Comparative Example 8 and Experimental Example 8 will be described in detail below.

Comparative Example 8 included 932.6 grams of PXG, 235.2 grams of DBC, 3.5 grams of TMA, 0.772 grams of TBT, 0.25 grams of $Mn(OAc)_2$ and 747.6 grams of PTA.

Experimental Example 8 included 1325 grams TCDDM, 235.2 grams DBC, 3.5 grams TMA, 0.772 grams TBT, 0.25 grams $Mn(OAc)_2$ and 747.6 grams PTA.

The above operation (b) and operation (c) were then performed to form polycarbonate polyester of Comparative Example 8 and Experimental Example 8.

The products of Comparative Example 8 and Experimental Example 8 were tested for tensile strength, flexural strength, impact resistance, glass transition temperature, melting temperature, intrinsic viscosity, and transmittance.

TABLE 6

|  | Comparative Example 8 | Experimental Example 8 |
| --- | --- | --- |
| Tg (° C.) | 81 | 118 |
| Tm (° C.) | N/A | N/A |
| IV (dl/g) | <0.30 | 0.47 |
| Transmittance (%) | N/A | 90 |

The molar ratios of formula (2)/formula (1) of Comparative Example 8 and Experimental Example 8 were both 0.3. The difference is that PXG and TCDDM were respectively used in Comparative Example 8 and Experimental Example 8. As listed in Table 6, the glass transition temperatures of Comparative Example 8 and Experimental Example 8 were 81° C. and 118° C., respectively, indicating that the use of TCDDM can make the polycarbonate polyester have better heat resistance, and can also provide better transmittance.

It is obvious that for those skilled in the art, various modifications and changes can be made to the structure of the present disclosure without departing from the scope or spirit of the present invention. In view of the foregoing, the present disclosure is intended to cover the modifications and changes of the present invention as long as they fall within the scope of the appended claims.

What is claimed is:

1. A polycarbonate polyester, comprising residues represented by following formula (1), formula (2) and formula (3):

formula (1)

formula (2)

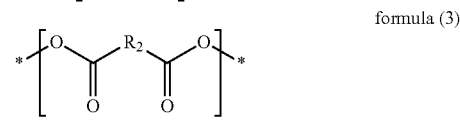

formula (3)

wherein $R_1$ is a $C_2$-$C_{15}$ hydrocarbon group;

$R_2$ is a $C_4$-$C_{16}$ hydrocarbon group;

a molar ratio of the residue of the formula (2) to the residue of the formula (1) is in a range of 0.1 to 0.6;

* indicates a linking bond;

wherein the residue of the formula (1) comprises:

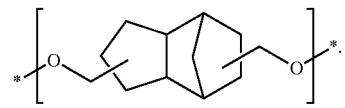

2. The polycarbonate polyester of claim 1, wherein the residue of the formula (1) further comprises a $C_2$-$C_{15}$ aliphatic linear or branched diol residue.

3. The polycarbonate polyester of claim 2, wherein the $C_2$-$C_{15}$ aliphatic linear or branched diol residue is selected from the group consisting of:

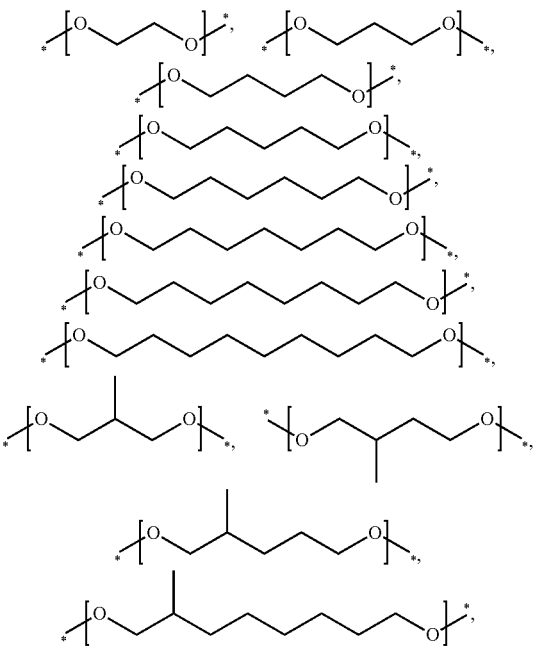

-continued

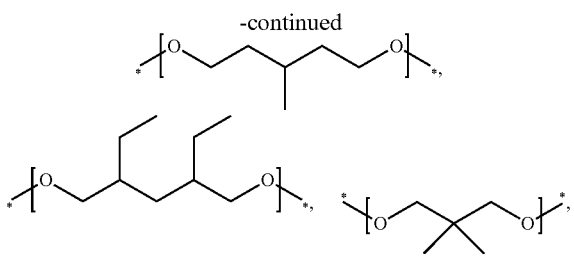

and a combination thereof, wherein * represents the linking bond.

4. The polycarbonate polyester of claim 2, wherein the $C_2$-$C_{15}$ aliphatic linear or branched diol residue is selected from the group consisting of:

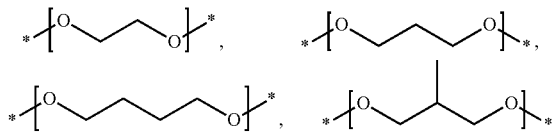

and a combination thereof, wherein * represents the linking bond.

5. The polycarbonate polyester of claim 1, wherein $R_2$ is

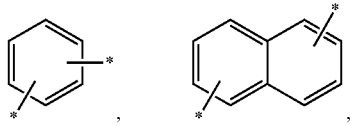

or a combination thereof, wherein * represents the linking bond.

6. The polycarbonate polyester of claim 1, wherein the residue of the formula (3) is present in an amount of no more than 50 mol % of the polycarbonate polyester.

7. The polycarbonate polyester of claim 1, wherein $R_1$ of the formula (1) is a polycycloalkyl group.

8. The polycarbonate polyester of claim 1, wherein $R_1$ of the formula (1) is a bicycloalkyl group or a tricycloalkyl group.

9. The polycarbonate polyester of claim 1, further comprising a residue represented by following formula (4):

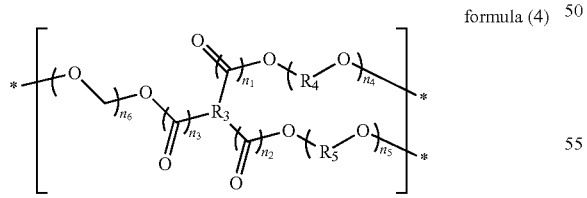

formula (4)

wherein $R_3$ is a $C_3$-$C_{20}$ hydrocarbon group;
$R_4$, $R_5$ and $R_6$ are $C_1$-$C_6$ hydrocarbon groups; and
$n_1$, $n_2$, $n_3$, $n_4$, $n_5$ and $n_6$ are 0 or 1.

10. The polycarbonate polyester of claim 9, wherein $R_3$ is a $C_3$-$C_{20}$ aliphatic hydrocarbon group or a $C_4$-$C_{20}$ aromatic hydrocarbon group.

11. The polycarbonate polyester of claim 9, wherein the residue represented by the formula (4) is selected from the group consisting of:

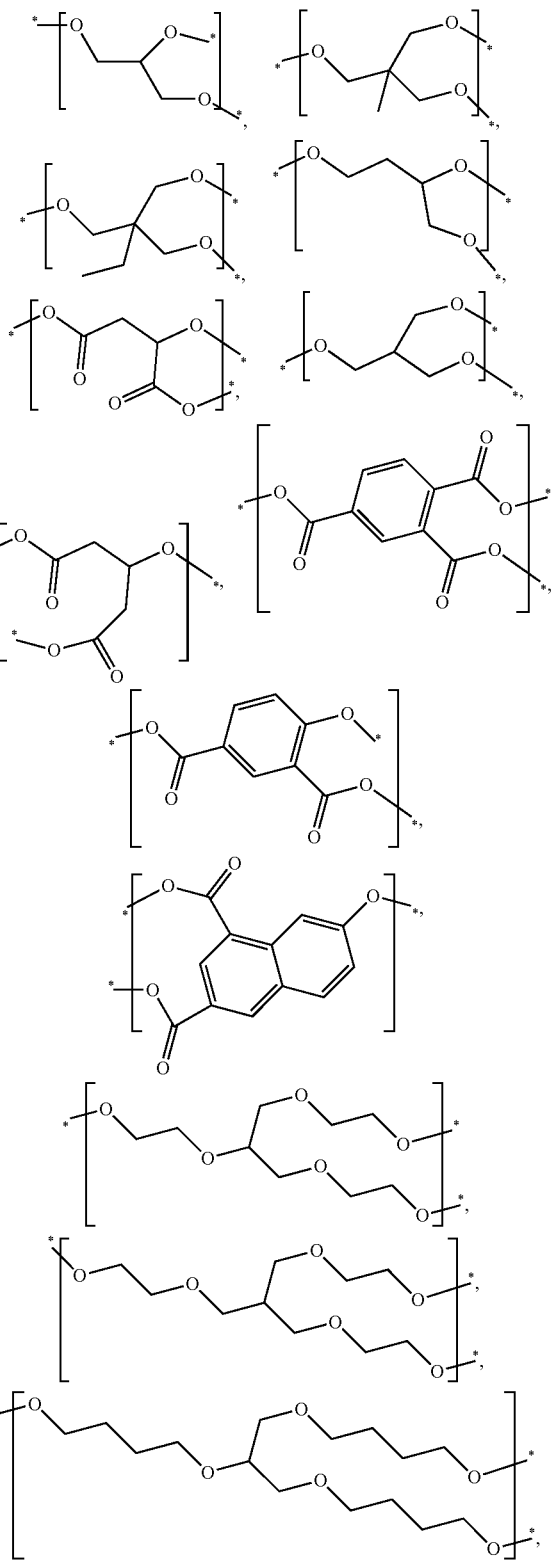

and a combination thereof, wherein * indicates a linking bond.

12. The polycarbonate polyester of claim 1, wherein the residue of the formula (2) is derived from a dialkyl carbonate monomer.

13. The polycarbonate polyester of claim 9, wherein the residue of the formula (4) is present in an amount of less than or equal to 0.4 mol % of the polycarbonate polyester.

14. The polycarbonate polyester of claim 9, wherein the residue of the formula (4) is present in an amount of 0.05 mol % to 0.2 mol % of the polycarbonate polyester.

* * * * *